United States Patent [19]

Hirasawa

[11] Patent Number: 5,406,345
[45] Date of Patent: Apr. 11, 1995

[54] OPTICAL SYSTEM CONTROLLING APPARATUS

[75] Inventor: Masahide Hirasawa, Kanagawa, Japan

[73] Assignee: Canon Kabushiki Kaisha, Tokyo, Japan

[21] Appl. No.: 178,478

[22] Filed: Jan. 7, 1994

Related U.S. Application Data

[63] Continuation of Ser. No. 104,808, Aug. 10, 1993, abandoned, and a continuation of Ser. No. 703,888, May 22, 1991, abandoned.

[30] Foreign Application Priority Data

May 28, 1990 [JP] Japan .................................. 2-139039

[51] Int. Cl.⁶ .......................................... G03B 13/00
[52] U.S. Cl. ................................................ 354/195.12
[58] Field of Search ................................ 354/400–409, 354/195.1, 195.12, 286; 358/227

[56] References Cited

U.S. PATENT DOCUMENTS

5,065,175 11/1991 Suzuki et al. .................. 354/195.12

Primary Examiner—David M. Gray
Attorney, Agent, or Firm—Robin, Blecker, Daley & Driscoll

[57] ABSTRACT

An optical system controlling apparatus includes a plurality of lenses for varying an optical characteristic, a plurality of driving parts for driving the plurality of lenses, respectively, a plurality of sensors for detecting the respective states of drive of the plurality of lenses, and a controlling circuit for driving each of the driving parts on the basis of detection information provided by the sensor and controlling each of the lenses during a steady state. The controlling circuit is capable of performing initialization for the respective lenses by parallel processing during an initial state before the steady state is established.

39 Claims, 7 Drawing Sheets

OPTICAL SYSTEM CONTROLLING APPARATUS

This is a continuation application under 37 CFR 1.62 of prior application Ser. No. 08/104,808, filed Aug. 10, 1993, which is a continuation of prior application Ser. No. 07/703,888 filed May 22, 1991, both now abandoned.

BACKGROUND OF THE INVENTION

1. Field of the Invention

The present invention relates to an optical system controlling apparatus and, more particularly, to an arrangement suitable for use as, for example, a lens position controlling apparatus for adjusting focus or varying magnification by moving lenses.

2. Description of the Related Art

The recent trend of cameras which are desired to have distinctive performance and miniature size is the wide use of a so-called inner focus lens arranged to adjust focus by moving a rear group of lenses.

Figure 1:
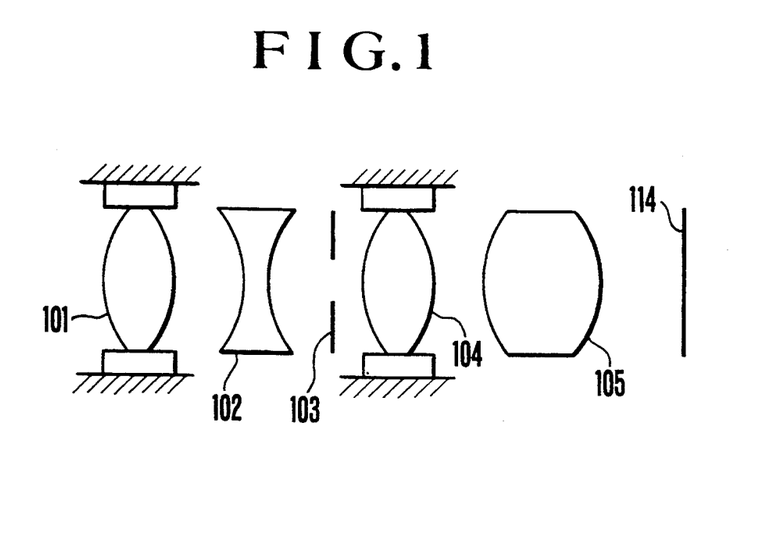
FIG. 1 is a schematic view showing the construction of an ordinary inner focus type lens system.

FIG. 1 schematically shows one example of a lens construction used in the inner focus type of lens system. The shown lens construction includes a fixed first lens 101, a second lens (zooming lens) 102 for varying magnification, an iris 103, a fixed third lens 104, a fourth lens (focusing lens) 105 which performs both a focus adjusting function and the function of correcting the movement of a focal plane resulting from the magnification varying operation of the second lens 102, and an image plane 114.

Figure 2:
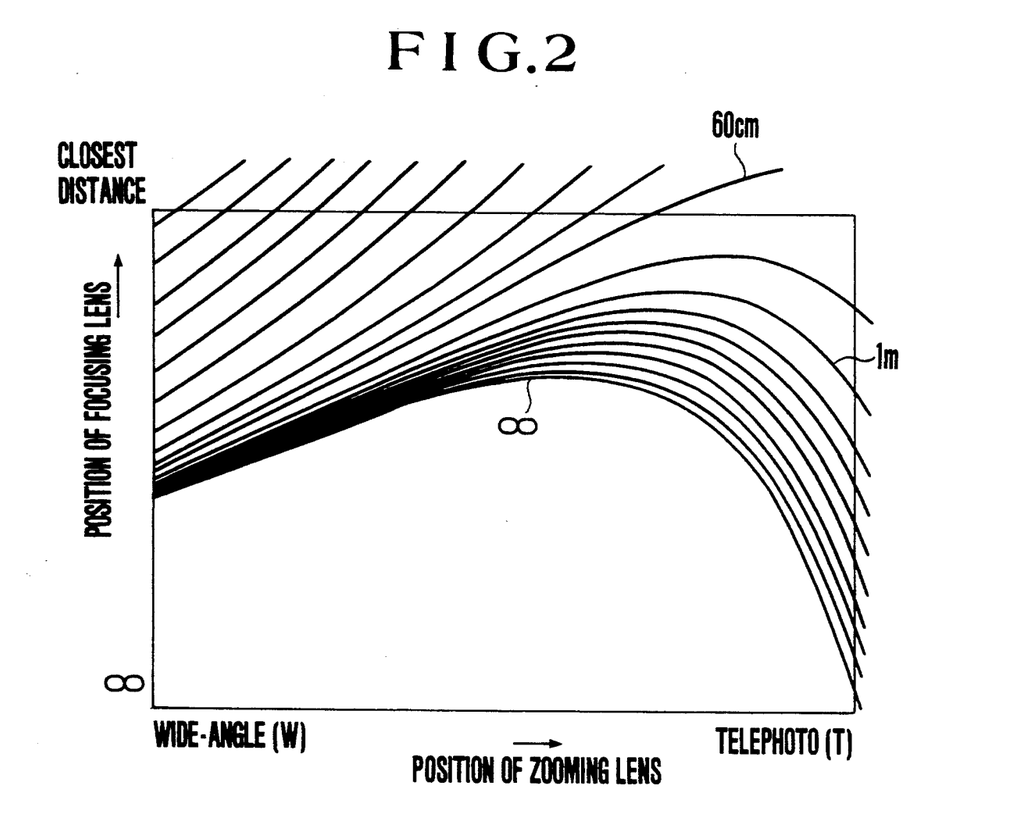
FIG. 2 is a graphic representation showing the movement loci of zooming and focusing lenses in an inner focus type lens system.

FIG. 2 is a graphic representation using a subject distance as a parameter, and shows the loci of the fourth lens 105 for forming an in-focus image in the image plane 114, the fourth lens 105 being shown as moving with respect to variations in the focal length in the case of the inner focus type of lens system which is placed under electronic control. Since the fourth lens 105, as described above, performs both the focus adjusting function and the function of correcting the movement of the focal plane resulting from the magnification varying operation, the movement of the fourth lens 105 draws correction curves unique to individual subject distances. In other words, when zooming is to be performed, it is necessary to select one correction curve corresponding to a subject distance of interest from those shown in FIG. 2 and cause the fourth lens 105 to move in accordance with the selected correction curve.

A method of causing the lens 105 of FIG. 1 to move along a correction locus unique to a particular subject distance is proposed in, for example, Japanese Laid-open Patent Application No. Hei 1-280709.

Figure 3:
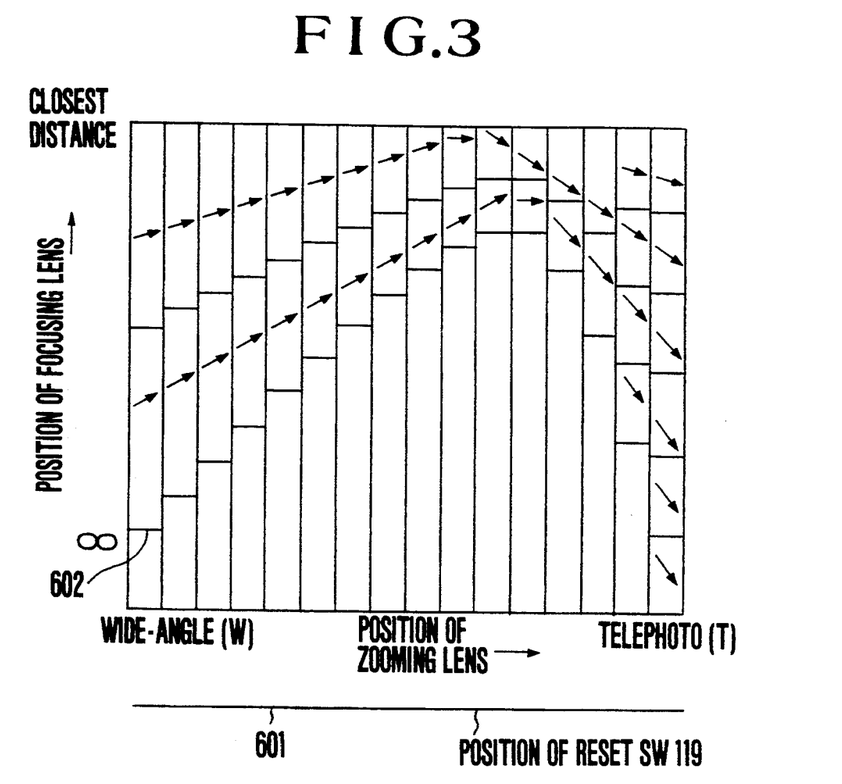
FIG. 3 is a chart showing the manner in which the characteristic curves of FIG. 2 are divided into a plurality of zones and representative speeds are assigned to the respective zones.

In this method, the loci shown in FIG. 2 are divided into zones each including a group of loci drawn at an approximately equal inclination as shown in FIG. 3, and one representative speed is assigned to each of the zones. Before zooming, if the fourth lens 105 is located in an in-focus position with respect to a subject, a specific zone is determined from among the zones of FIG. 3 in accordance with the positions of the zooming and focusing lenses. At the same time that zooming is started, the representative speed of the fourth lens to be driven, i.e., the focusing lens 105, is determined. After the zooming has been started, the focal length and the position of the focusing lens 105 vary progressively. As a result, as shown in FIG. 3, the focusing lens 105 progressively moves from one zone to another and its representative speed also changes progressively.

By connecting the steps of displacement corresponding to the changes in the representative speed, it is possible to obtain curves which approximate those shown in FIG. 2, whereby the zooming can be performed with an in-focus state maintained.

However, the above-described method has the problem that the representative speed for each of the zones is determined with respect to a single zooming-lens moving speed and if the zooming-lens moving speed varies due to, for example, a variation in the torque of a zooming motor, a temperature change or a change in the altitude of a camera, the focusing lens does not correctly follow any of the loci of FIG. 2 and defocus occurs during zooming.

Japanese Laid-open Patent Application No. Hei 1-319717 proposes a method of adjusting a zooming-lens driving speed during zooming by increasing or decreasing a coefficient to be multiplied by the aforesaid representative speed in accordance with a change in an actual zooming speed.

Figure 4:
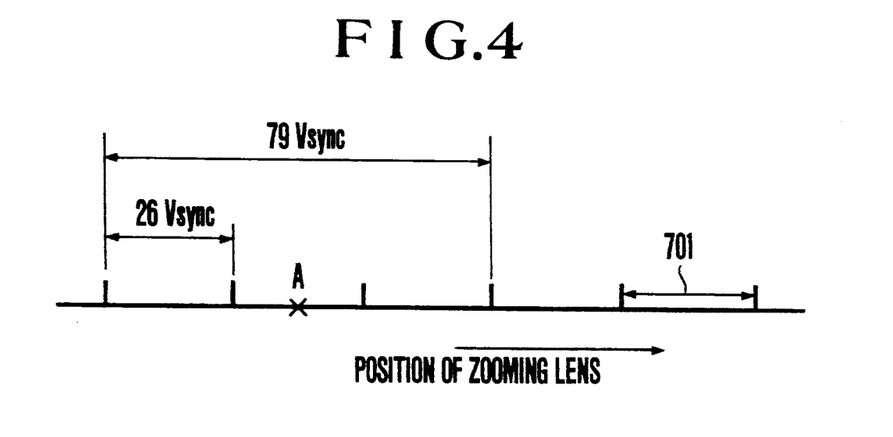
FIG. 4 is a view which is used for explaining the operation of measuring the speed of the zooming lens.

Referring to FIG. 3, for example, the horizontal axis is divided into 16 equal parts. If it is assumed that the speed of the zooming lens is set to a speed which permits the zooming lens to move between a telephoto end and a wide-angle end in 7 seconds, 26 vertical sync periods (26 Vsync) are required for the zooming lens to pass through a single zone 701 as shown in FIG. 4 in the case of the NTSC system. If N (Vsync) is taken to pass through the single zone during actual zooming, the change ratio Rzs of the actual zooming speed to a reference value (7 seconds from the telephoto end to the wide-angle end) of the zooming speed is expressed as:

$$Rzs = N/26 \qquad (1)$$

Accordingly, during zooming, by always measuring the number of vertical sync periods required to pass through the aforesaid single zone and multiplying 1/Rzs by the aforesaid representative speed, it is possible to perform the zooming at the moving speed of the fourth lens 105 according to a variation of the zooming speed without defocus.

If the first zooming is to be performed after the power source has been turned on, there is no measurement data as to zooming speeds and Rzs is not updated with a correct value obtained from the actual driving speed of the zooming lens. To cope with this problem, the present applicant has developed a system which includes the steps of causing the zooming lens to move by the minimum amount required for measurement immediately after the power source has been turned on, determining the initial value of Rzs, finding an actual focusing-lens speed by multiplying this value of Rzs by a representative speed corresponding to the zone where the zooming lens is located, then returning the zooming lens to its original position, and subsequently establishing ordinary operating conditions.

Position control over the fourth lens, i.e., the focusing lens 105, will be explained below.

As is apparent from FIGS. 2 and 3 as well as the foregoing description, drive control over the fourth lens requires accurate position detection and good speed switching performance. To meet the requirement, a stepping motor or a similar device which is not easily influenced by inertia and which provides a constant amount of drive with respect to a drive signal and has a wide speed response range, is widely used as an actuator which constitutes a fourth-lens driving means. If a stepping motor is used as an actuator for the focusing lens 105, it is convenient to utilize a position detection method including the steps of counting the number of drive pulses outputted from the stepping motor by using a counter and causing the count to correspond to the position of the focusing lens. In this method, the counter serving as a position encoder is an incremental counter, and to cause the count to correctly correspond to the coordinate of the vertical axis of the locus diagram of FIG. 3, from the time the power source is turned on until the time an ordinary photographic operation is started, it is necessary to execute control to move the focusing lens 105 to a predetermined position, substitute a value corresponding to the predetermined position into the counter with the focusing lens 105 located at that position, and start counting for detecting the position of the focusing lens 105 which varies with the movement thereof.

To realize such control, in the above-described system, it is necessary to perform measurement of the zooming speed and presetting of the position detection counter for the fourth lens 105 between the time the power source is turned on and the time the ordinary photographic operation is started.

However, the above-described arrangement has contradictory problems. Since plural kinds of preparatory operations must be performed within a short time between the time the power source is turned on and the time the ordinary photographic operation is started, it takes a long time to effect a reset operation. As a result, a photographer must wait for a long time until the system starts the ordinary photographic operation. If a reset time is limited so as to reduce the waiting time of the photographer, imperfect resetting will take place and a good ordinary photographic operation will not be performed due to variations in the state of the lens system immediately after the power source is turned on.

SUMMARY OF THE INVENTION

A first object of the present invention which has been devised to solve the above-described problems is to provide an optical system controlling apparatus which can operate rapidly and accurately.

A second object of the present invention is to provide a lens controlling apparatus which makes it possible to realize the function of concurrently and in parallel performing the reset operations of a plurality of optical systems in lens control over an optical instrument such as a camera, and also to reduce the time required for the reset operations.

A third object of the present invention is to provide a lens controlling apparatus which can cause a plurality of driven elements within a lens system to concurrently move before the start of photography, thereby finding through a rapid measurement the movement control information required to be obtained before the photography. The lens controlling apparatus can also locate the driven elements at positions corresponding to a subject at the start of the photography by switching the state of control of the driven elements from movement control to photographic control within the time remaining after the completion of the aforesaid measurement.

To achieve the above objects, in accordance with one aspect of the present invention, there is provided an optical system controlling apparatus which includes a plurality of controlled systems for varying an optical characteristic, a plurality of driving means for driving the plurality of controlled systems, respectively, a plurality of detecting means for detecting the respective states of drive of the plurality of controlled systems, and controlling means for driving each of the driving means on the basis of detection information provided by the detecting means and controlling each of the controlled systems during a steady state, the controlling means being capable of performing initialization of the respective controlled systems by parallel processing during an initial state before the steady state is established.

A fourth object of the present invention is to provide a lens controlling apparatus for use with a lens system whose focus position varies with the movement of a zooming lens. The lens controlling apparatus can rapidly and accurately control the zooming lens and a focusing lens and can operate very smoothly immediately after the operation has started.

To achieve the above object, in accordance with another aspect of the present invention, there is provided a lens controlling apparatus for use with a lens system arranged to correct a focal plane varying with zooming by moving a focusing lens. The lens controlling apparatus can execute concurrently in parallel the reset operation of a zooming lens for measuring the actual speed of the zooming lens and finding the accurate follow-up speed of a focusing lens and the reset operation of the focusing lens for accurately determining a locus traced by the focusing lens and obtaining control information for causing the focusing lens to move in highly accurate follow-up relation to the zooming lens. Accordingly, initialization of the system can be effected with accuracy in a short time.

A fifth object of the present invention is to provide a video camera provided with the above-described lens controlling apparatus.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Embodiments of an optical system controlling apparatus according to the present invention will be described below with reference to the accompanying drawings.

Figure 5:
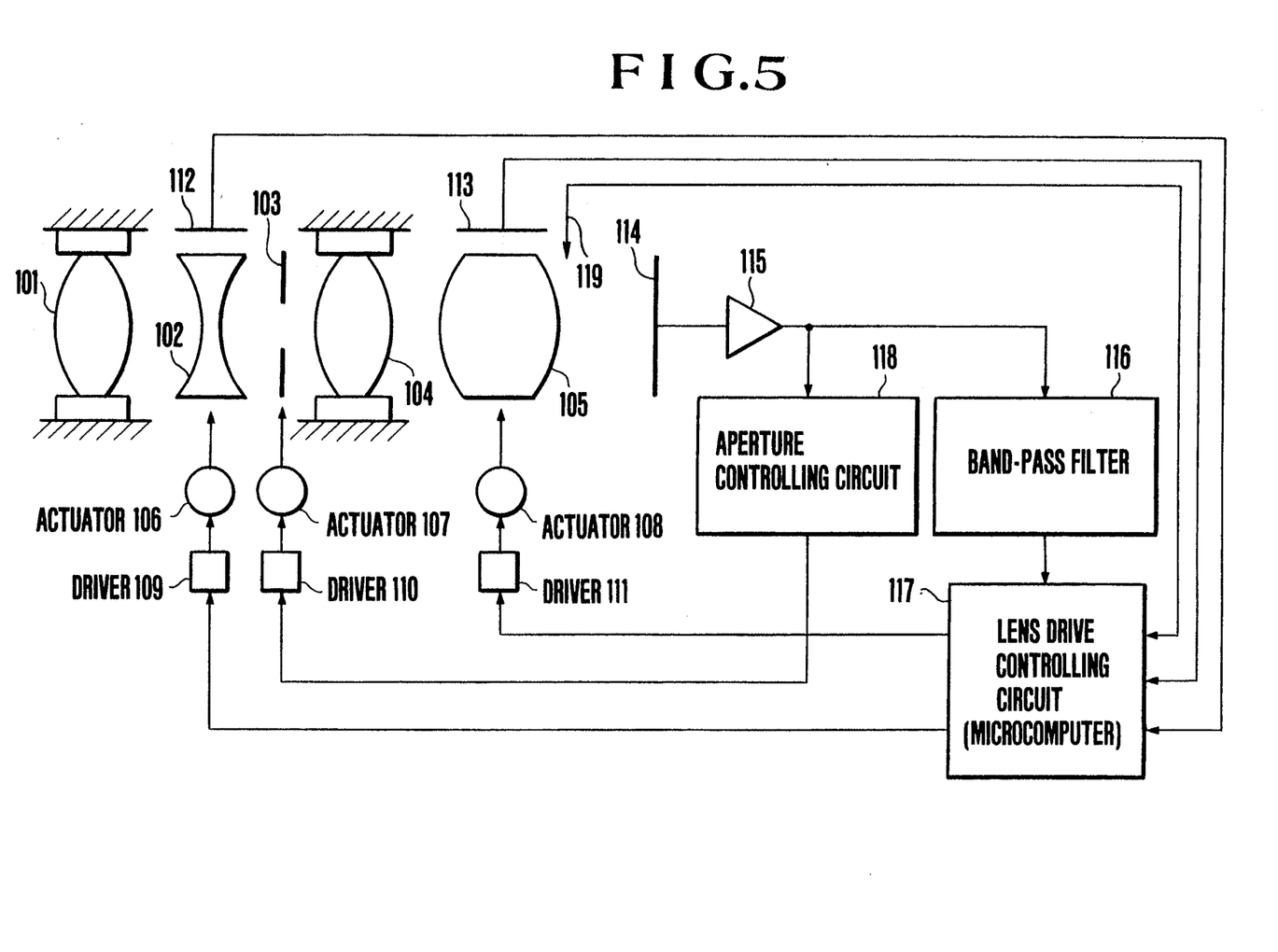
FIG. 5 is a block diagram showing one embodiment of an optical system controlling apparatus according to the present invention.

FIG. 5 is a block diagram schematically showing the arrangement of a first embodiment of the present invention.

The optical system controlling apparatus shown in FIG. 5 comprises optical system elements 101, 102, 103, 104 and 105 each having a function substantially identical to that of the corresponding element explained in connection with FIG. 1, actuators 106, 107 and 108 for driving the zooming lens 102, the iris 103 and the focusing lens 105, respectively, each of the actuators 106, 107 and 108 consisting of, for example, a motor or the like, drivers 109, 110 and 111 for driving and controlling the respective actuators 106, 107 and 108, and position encoders 112 and 113 for detecting the position of the zooming lens 102 and that of the focusing lens 105, respectively. The position encoder 113 which serves as a focusing encoder is secured to, for example, the focusing lens 105 or a support member disposed for movement integrally with the focusing lens 105. The focusing encoder 113 may include an optical sensor made up of a light emitting element and a light receiving element, and a slit plate having a plurality of slits formed side by side in the direction of lens movement, and is arranged in such a manner that pulses provided at an output of the optical sensor are counted by a counter incorporated in a microcomputer.

The optical system controlling apparatus shown in FIG. 5 also comprises an image sensor 114, such as a charge-coupled device, for converting an image formed by a lens unit into a video signal and outputting it, an amplifier 115 for amplifying the output signal of the image sensor 114, a band-pass filter 116 for extracting only a high-frequency component useful for detecting the state of focus from the output signal of the amplifier 115, a lens drive controlling circuit (microcomputer) 117 for responding to the output signal of the band-pass filter 116 to execute various kinds of control, such as control for effecting focusing by moving the focusing lens 105 in the direction in which the high-frequency component increases or control for executing zooming by concurrently moving the zooming lens 102 and the focusing lens 105 in the previously-described manner, an aperture controlling circuit 118 for measuring the luminance of a subject on the basis of the luminance level of the output signal of the amplifier 115 and adjusting the aperture size of the iris 103 to maintain the luminance at a constant level, and a reset switch 119 fixed in position within the range over which the focusing lens 105 is movable. As the focusing lens 105 passes through a position corresponding to the reset switch 119, the reset switch 119 is turned on to supply a reset signal to the lens drive controlling circuit 117. The reset switch 119 is positioned outside the infinity end of the substantial movable range of the focusing lens 105 within the mechanical movable range thereof.

Figure 6A:
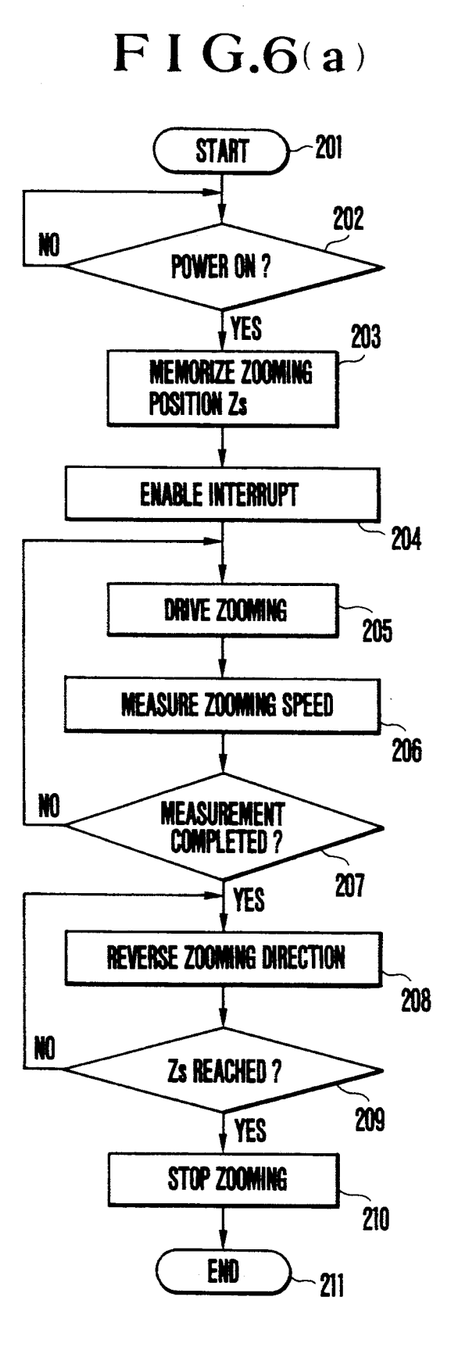
FIGS. 6(a) and 6(b) are flowcharts showing control algorithms in the present inventive apparatus.
Figure 6B:
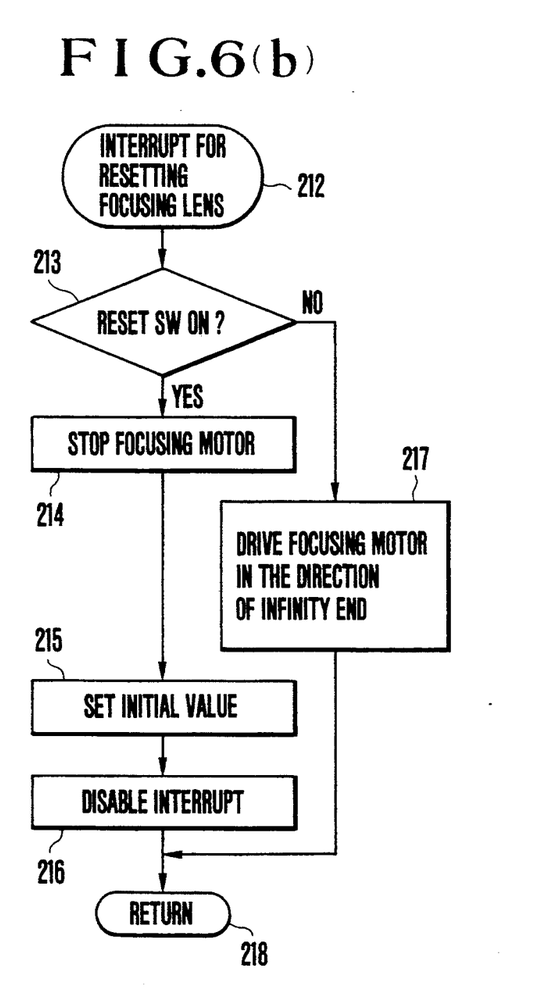

FIGS. 6(a) and 6(b) show flowcharts of a control program which is stored in the lens drive controlling circuit 117 for carrying out the present invention in the arrangement shown in FIG. 5.

The control program shown in FIG. 6(a) includes the following steps: Step 201 which indicates the start of the control program; Step 202 where it is determined whether a power source has been turned on; Step 203 where the position of the zooming lens 102 which is in operation is detected by the encoder 112 at a resolution level thereof and memorized as Zs; Step 204 which enables an interrupt during the reset operation of the zooming lens 102 so as to perform a reset program to be executed when the focusing lens 105 moves to its reset position; Step 205 where the zooming lens 102 is driven to selectively move in the direction of a wide-angle side or a telephoto side so as to perform the reset operation of the zooming lens 102; Step 206 where measurement of a zooming-lens driving speed is performed by the above-described method and a focusing-lens driving speed is corrected on the basis of the difference between the measured speed and a normal speed; Step 207 where it is determined whether the measurement of the zooming-lens driving speed has been completed; Step 208 where the zooming lens 102 is made to move in a direction opposite to the direction in which the zooming lens 102 has been driven in Step 205; Step 209 where it is determined whether the output of the zooming encoder 112 has reached Zs memorized in Step 203, that is, whether the zooming lens 102 has returned to the position where the zooming lens 102 was located before it is driven; Step 210 where the driving of the zooming lens 102 is stopped; and Step 211 which indicates the end of the control program.

A flowchart including Steps 212 to 218 shows a control flow of interrupt processing which is executed each time an interrupt occurs in Step 204 during the execution of the flow of Steps 201 to 211.

The control flow of FIG. 6(b) includes the following steps: Step 212 which indicates the start of processing for resetting the above-described counter for position detection as to the focusing lens 105; Step 213 where it is determined whether the reset switch 119 for detection of a focusing-lens reset position has been turned on; Step 214 where the focusing motor 108 is stopped when the reset switch 119 is turned on; Step 215 where the counter for position detection as to the focusing lens 105 is initialized by substituting a predetermined value into the counter; Step 216 where the aforesaid interrupt is disabled; Step 217 where if the reset switch 119 has not been turned on, the focusing motor 108 is driven to move the focusing lens 105 toward an infinity end; and Step 218 where the above-described sequence of steps of the interrupt program is brought to an end and the process is returned to an interrupt point so as to resume the control flow of Steps 201 to 211.

It is assumed here that the position of the reset switch 119 is set to a position below the horizontal axis of FIG. 3 as shown by reference numeral 601, that is, a position outside the infinity end within the substantial movable range of the focusing lens 105.

Referring to FIGS. 6(a) and 6(b), when the control flow is started in Step 201, the process proceeds to Step 202, where it waits for the power source of the system to be turned on.

When it is detected in Step 202 that the power source has been turned on, the process proceeds to Step 203, where the output value of the zooming encoder 112, that is, the position of the zooming lens 102, is read and stored as Zs in a predetermined memory area within the lens drive controlling circuit 117. In Step 204, processing is performed for enabling an interrupt to occur in the control flow and initiating the counter resetting program for detecting the position of the focusing lens 105. After this processing, the reset operation of the aforesaid counter is executed in parallel with the operation of measuring the speed of the zooming lens 102. The reset operation of the zooming lens 102 is first explained and the interrupt program is explained later.

After the interrupt has been enabled, the zooming lens 102 is made to move in either direction in Step 205 to measure the moving speed of the zooming lens 102. In Step 206, while the zooming lens 102 is being moved, the output value of the zooming encoder 112 is consistently supervised and speed measurement is performed, as described above, by examining how many vertical sync periods are required for the zooming lens 102 to pass through one or more zones which are formed in the direction of movement of the zooming lens 102. The above-described operation is repeated until it is determined in Step 207 that the zooming lens 102 has passed through a predetermined number of zones and the speed measurement has been completed.

When the completion of the measurement is confirmed in Step 207, the zooming lens 102 is made to move in a direction opposite to the direction in which the zooming lens 102 has been driven in Step 205. If it is determined in Step 209 that the output value of the zooming encoder 112 has reached the zooming-lens position Zs memorized in Step 203, that is, when the zooming lens 102 returns to its original position, the process proceeds to Step 210, where the drive of the zooming lens 102 is stopped, thus completing the reset operation.

By the above-described processing, the actual driving speed of the zooming lens 102 is measured and the ratio of the measured speed to the normal speed is obtained by using the above-noted equation (1). The normal representative speed of the focusing lens 105 which is set for the zone in which the zooming lens 102 is positioned, i.e., one of the zones shown in FIG. 3, is corrected on the basis of the aforesaid ratio. Accordingly, as the zooming lens 102 is driven, it is possible to cause the focusing lens 105 to move in follow-up relation to the zooming lens 102 while tracing the corresponding curve in FIG. 2, whereby zooming free from defocus can be achieved.

The reset operation of the counter for position detection as to the focusing lens 105 which is executed after the interrupt has been enabled in Step 204, will be explained below. This reset operation carries out processing for accurately presetting position information on the focusing lens 105 in the position detection counter for the same, and highly accurately controlling and driving the focusing lens 105 in accordance with the loci shown in FIG. 2 so that the position of the focusing lens 105 can be accurately detected.

When the interrupt program starts in Step 212, the process proceeds to Step 213, where it is determined whether the reset switch 119 has been turned on. If the reset switch 119 is fixed at the position shown by reference numeral 601 in FIG. 3, it follows that the reset switch 119 is necessarily positioned on the infinity side with respect to an ordinary in-focus range from the closest distance to infinity (a range marked with speed vectors in FIG. 3). Accordingly, if the power source is turned off and again turned on in ordinary operating conditions, the focusing lens 105 will be naturally located somewhere within the ordinary in-focus range from the closest distance to infinity. Accordingly, if the reset switch 119 has not been turned on in Step 213, it can be determined that the focusing lens 105 is necessarily located on the closest-distance side with respect to the position 601. If the reset switch 119 has not been turned on, the process proceeds to Step 217, where the actuator 108 of the focusing lens 105 is driven in the direction of the infinity end. Subsequently, each time an interrupt takes place, the above-described operation is repeated.

If it is determined in Step 213 that the reset switch 119 has been turned on, the process proceeds to Step 214, where the focusing-lens driving actuator 108 is stopped. At this time, the position of the focusing lens 105 corresponds to the position of the reset switch 119. Accordingly, in Step 215, a value corresponding to the position of the reset switch 119 is substituted into the position detection counter for the focusing lens or fourth lens 105. In Step 216, the interrupt is disabled to prevent the focusing lens 105 from accidentally moving.

By the above-described processing, it is possible to concurrently perform the reset operation of the focusing lens 102 and that of the focusing lens 105. The interrupt enabling step and the interrupt disabling step are inserted so that if the reset operation of the focusing lens 105 is completed, no further reset operation is performed. It is, therefore, possible to prevent a malfunction and to improve a computing speed.

Figure 8:
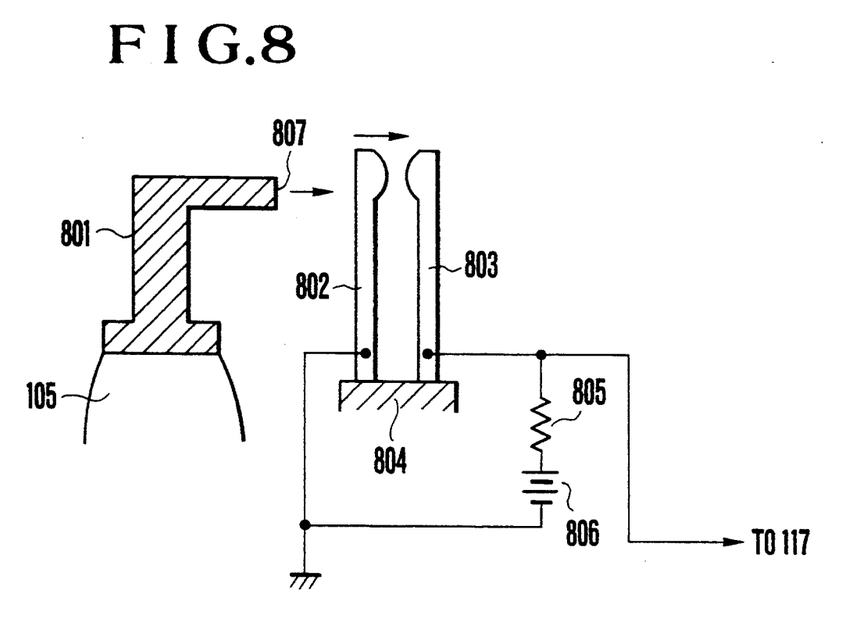
FIG. 8 is a schematic view showing the construction of a reset position detecting switch for a focusing lens.
Figure 9:
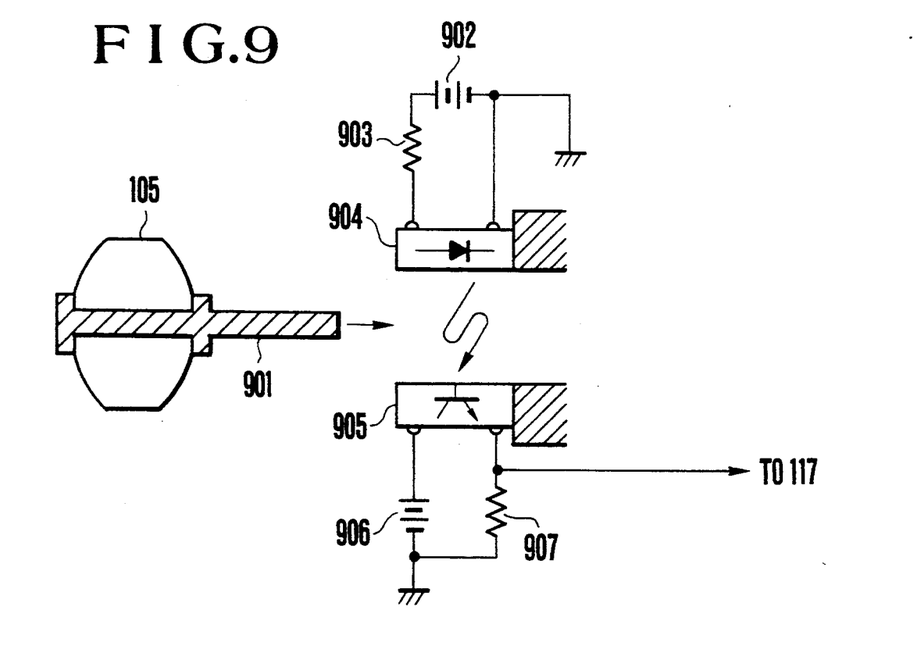
FIG. 9 is a schematic view showing another example of the construction of the reset position detecting switch for the focusing lens.

The structure of the above-described reset switch 119 is shown in FIGS. 8 and 9. By arranging the reset switch 119 as shown, it is possible to more positively determine the direction in which the actuator 108 for driving the focusing lens 105 is driven in the reset operation.

Referring to FIG. 8, an actuating piece 801 formed of an electrically insulating material is fixed to the focusing lens 105, and an end 807 is located in such a manner that it presses an operating piece 802 as the focusing lens 105 moves in the direction of the shown arrow. The operating piece 802 and an operating piece 803 cooperate with each other to form the reset switch 119, and are formed of metal having elasticity. An electrically insulating material 804 is fixed as a switch supporting part to support the operating pieces 802 and 803. Reference numeral 805 denotes a resistor and reference numeral 806 denotes a D.C. battery.

In operation, as the focusing lens 105 moves toward the operating pieces 802 and 803 of the reset switch 119, the operating piece 802 is pressed by the end 807 of the actuating piece 801 and brought into contact with the operating piece 803. When the focusing lens 105 further moves in the direction of the shown arrow, the operating pieces 802 and 803 are deformed in the direction of the shown arrow in contact with each other. If the focusing lens 105 moves in the direction opposite to that of the shown arrow, the operating pieces 802 and 803 are restored to the original shapes shown in FIG. 8 by their own elasticity.

By the above-described operation, once the operating pieces 802 and 803 are pressed into contact with each other by the end 807 of the actuating piece 801, they are held in contact with each other after chattering substantially disappears as long as the actuating piece 801 does not move in the opposite direction. In other words, the fact that the operating pieces 802 and 803 are not in contact with each other means that the focusing lens 105 is necessarily located in a zone above the position 601 as viewed in FIG. 3. Accordingly, with information about the reset switch 119, it is possible to accurately determine the direction in which the focusing lens 105 is made to move.

FIG. 9 shows an example in which an optical sensor is used as the reset switch 119. Referring to FIG. 9, a light blocking member 901 is fixed to the focusing lens 105. When the focusing lens 105 is made to move in the direction of the shown arrow and the light blocking member 901 is inserted between a light emitting element 904 such as a photodiode and a light receiving element 905 such as a phototransistor, light emitted from the light emitting element 904 is blocked at an intermediate position between the light emitting element 904 and the light receiving element 905. Reference numerals 902 and 906 denote D.C. power sources for the light emitting elements 904 and 905, respectively, and reference numerals 903 and 907 denote resistors. With the cooperation of these elements, the light receiving element 905 is turned on only when it receives light from the light emitting element 904, and when the light is blocked, the light receiving element 905 is turned off.

Referring to FIG. 9, when the focusing lens 105 moves in the direction of the shown arrow and the light blocking member 901 blocks the light of the light emitting element 904, a signal to be transmitted to the lens drive controlling circuit 117 changes from "1" to "0". The value "0" continuously appears until the focusing lens 105 moves in the direction opposite to that of the shown arrow and the light blocking the member 901 stops blocking light. Accordingly, as in the case of the example shown in FIG. 8, if no light is blocked, the focusing lens 105 is necessarily located in a zone above the reset-switch position 601 shown in FIG. 3, and it is possible to accurately determine the direction in which the focusing lens 105 is made to move during the reset operation.

Figure 7A:
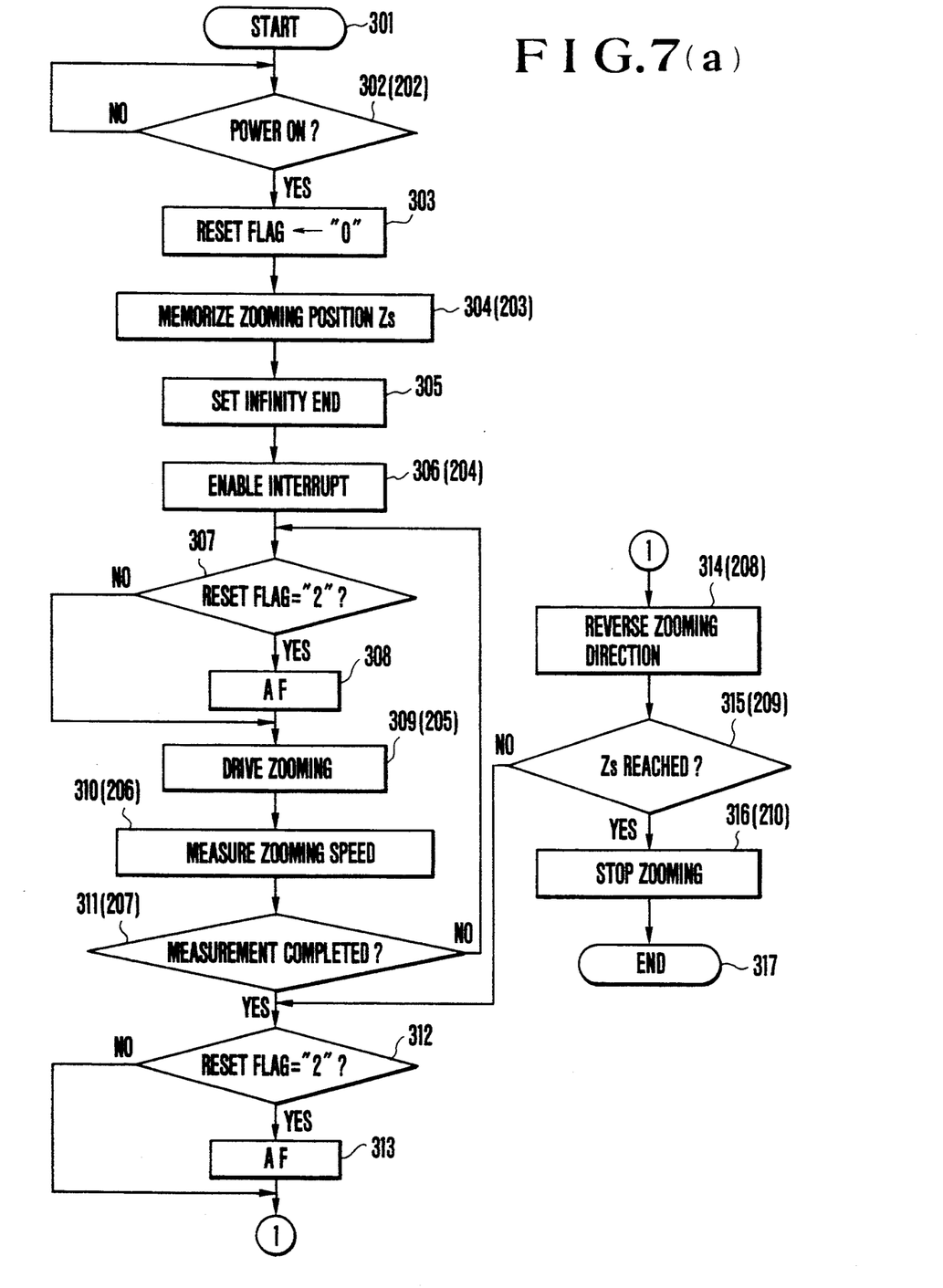
FIGS. 7(a) and 7(b) are flowcharts showing other examples of the control algorithms in the present inventive apparatus.
Figure 7B:
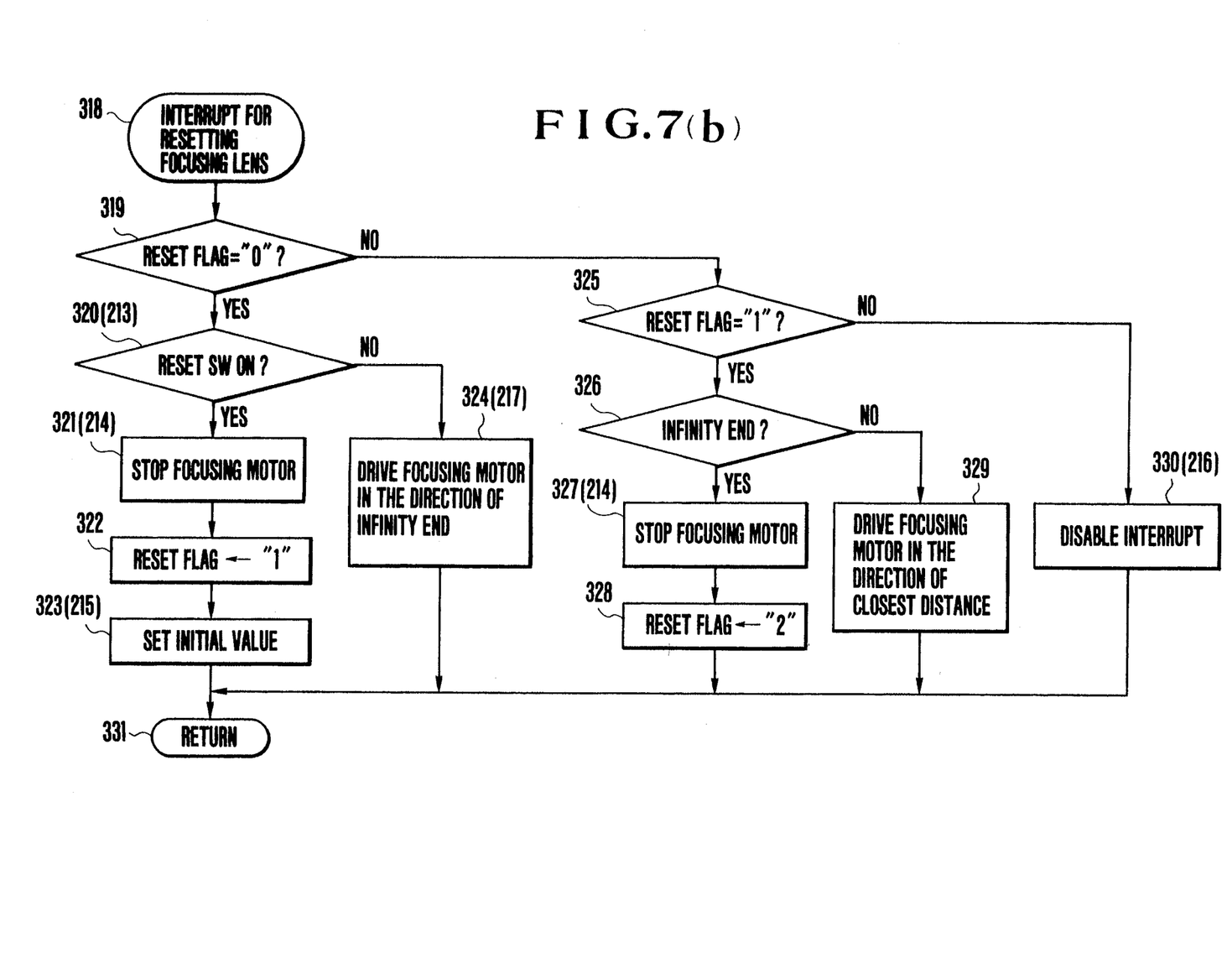

FIGS. 7(a) and 7(b) are flowcharts showing another embodiment of a control algorithm for the lens drive controlling circuit 117 according to the present invention. The construction of the system is substantially identical to that shown in FIG. 5. In these flowcharts, regarding steps which perform processing similar to that of the corresponding steps of the flowcharts shown in FIGS. 6(a) and 6(b), the corresponding step numbers used in FIGS. 6(a) and 6(b) are noted in parentheses.

In this embodiment, in addition to the parallel processing of the reset operation of each lens which is similar to the processing explained in connection with the first embodiment shown in FIGS. 6(a) and 6(b), autofocus processing for adjusting focus to eliminate substantial defocus is introduced, whereby the position of the focusing lens 105 is set so that a subject will have been focused when the reset operation is completed and a substantial photographic operation is started.

The control flowcharts shown in FIGS. 7(a) and 7(b) include the following steps: Step 301 which indicates the start of the processing program; Step 302 where the process waits for the power source of the system to be turned on; and Step 303 where a reset flag provided for selecting the reset operation is reset to "0".

The control flowcharts also comprise Step 304 where the zooming-lens position information Zs detected by the zooming encoder 112 is detected and memorized; Step 305 where the value of the boundary, nearest to the infinity end, of each of the zones marked with the speed vectors of the focusing lens 105 which change with respect to the horizontal axis of FIG. 3 is read out from a memory in the lens drive controlling circuit 117 on the basis of the value of the position information Zs on the zooming lens 102 which has been detected in Step 304 by the zooming encoder 112; Step 306 where an interrupt for the reset operation of the focusing lens 105 is enabled during the reset operation of the zooming lens 102; Step 307 where it is determined whether the reset flag has been set to "2"; Step 308 for performing automatic focus adjustment (hereinafter referred to as "AF") for moving the focusing lens 105 to an in-focus point to cope with substantial defocus without taking into account follow-up relation to the zooming lens 102; Step 309 where the zooming lens 102 is driven to selectively move in the direction of the wide-angle side or the telephoto side so as to perform the reset operation of the zooming lens 102; Step 310 where measurement of a zooming-lens driving speed is performed in a manner similar to that explained with reference to the flow of FIG. 6(a); Step 311 where it is determined whether the measurement of the zooming-lens driving speed has been completed; Step 312 where it is determined whether the reset flag has been set to "2" as in Step 307; and Step 313 where an ordinary AF operation is performed as in Step 308.

The control flowcharts also comprise Step 314 where the zooming lens 102 is driven in a direction opposite to the direction in which it has been driven in Step 309; Step 315 where it is determined whether the operation of measuring the driving speed of the zooming lens 102 has been completed and the zooming lens 102 has returned to its original zooming-lens position Zs; Step 316 where the zooming lens 102 and is stopped after the completion of the reset operation of the zooming lens 102; Step 317 where this control flow is brought to an end.

Interrupt processing for executing the reset operation of the focusing lens 105 which is shown as Steps 318 to 331 will be explained below.

The control flow of FIG. 7(b) includes the following steps: Step 318 which indicates the start of the interrupt processing for executing the reset operation of the focusing lens 105, i.e., presetting the counter for position detection as to the focusing lens 105; Step 319 where it is determined whether the reset flag is "0"; Step 320 where it is determined whether the reset switch 119 has been turned on; Step 321 where the motor 108 for driving the focusing lens 105 is stopped when the reset switch 119 is turned on; Step 322 where "1" is substituted into the reset flag; Step 323 where the counter for position detection as to the focusing lens 105 is initialized by substituting a predetermined value into the counter; Step 324 where the focusing lens 105 is driven to move toward the infinity end; Step 325 where it is determined whether the value of the reset flag is "1"; Step 326 where it is determined whether the value of the position detection counter has reached the value which has been set in Step 305, i.e., the value corresponding to the infinity end; Step 327 where the motor 108 for driving the focusing lens 105 is stopped; Step 328 where "2" is substituted into the reset flag; Step 329 where the focusing lens 105 is driven toward the closest-distance side; Step 330 where the interrupt is disabled; and Step 331 where the interrupt processing for the focusing-lens resetting operation is completed and the process returns to an interrupt point in the control flow of Steps 301 to 317.

The program having the above-described processing procedures will be described below.

When the program is started in Step 301, the process proceeds to Step 302, where it waits for the power source to be turned on as in the case of the first embodiment shown in FIGS. 6(a) and 6(b). If it is determined that the power source has been turned on, the process proceeds to Step 303, where the reset flag is reset to "0". In Step 304, the output value of the zooming-position encoder 112 is memorized as Zs. In Step 305, the movable limit of the focusing lens 105 on the infinity side which changes with the value of Zs as shown at 602 in FIG. 3, for example, with the zooming lens 102 positioned in a zone nearest to the wide-angle side, is found and memorized.

Then, in Step 306, as in the first embodiment, the processing of enabling an interrupt operation for the interrupt program for resetting the counter for position detection as to the focusing lens 105 is carried out. Thus, the processing of Steps 318 to 330 is also started. In Step 307, it is determined whether the value of the reset flag is "2". If the value is "2", it is determined that the reset operation of the counter for position detection as to the focusing lens 105 has been completed, and in Step 308 an ordinary AF operation is carried out. Although described later in detail, if the interrupt processing routine has completed the reset operation of the focusing lens 105, the value of the reset flag is "2". If the value of the reset flag is not "2", it is determined that the reset operation of the focusing lens 105 has not been completed, and the process proceeds to Step 309 without executing Step 308. In Steps 309 and 310, the driving speed of the zooming lens 102 is measured. In Step 311, the processing of Steps 307 to 310 is repeated until the measurement of the zooming-lens driving speed is completed.

When the measurement of the zooming-lens driving speed is completed, the process proceeds to Step 312, where the contents of the reset flag are again examined. If the value of the reset flag is "2", that is, if the reset operation of the focusing lens 105 by the interrupt processing has been completed, the process proceeds to Step 313, where an ordinary AF operation is executed to perform focus adjustment to eliminate defocus. If it is determined in Step 312 that the value of the reset flag has not reached "2", the process jumps to Step 314, where the zooming lens 102 is reversed. In Step 315, the reverse driving of the zooming lens 102 is continued until the output of the zooming encoder 112 is restored to Zs which means the position where the zooming lens 102 was located before the measurement operation was started.. If Zs is reached, the process proceeds to Step 316, where the zooming lens 102 is stopped. In Step 317, the reset operation of the entire system is completed.

The reset operation, starting with Step 318, of the counter for position detection as to the focusing lens 105 will be explained below.

In Step 306, if the interrupt for the counter resetting operation starting with Step 318 is enabled, it is determined in Step 319 whether the value of the reset flag is "0". If the value of the reset flag is "0", this indicates that no initial value has been substituted into the counter, and the process proceeds to Step 320. In Step 320, if the reset switch 119 has not been turned on, this indicates that the focusing lens 105 is located in a zone above the reset position 601 shown in FIG. 3. Accordingly, the process proceeds to Step 324, where the focusing lens 105 is driven to move toward the infinity end. At this time, if the reset switch 119 has been turned on, the process proceeds to Step 321 in order to substitute the aforesaid initial value into the position detection counter. In Step 321, the focusing lens 105 is stopped, and after the reset flag has been set to "1" in Step 322, the initial value is substituted in Step 323.

If it is determined in Step 319 that the value of the reset flag is not "0" and if it is determined in Step 315 that the value of the reset flag is "1", the process proceeds to Step 326, where it is determined whether the value of the aforesaid position detection counter has reached the infinity-end value which has been set in Step 305. If the infinity-end value has not been reached, the process proceeds to Step 329, where the focusing lens 105 is made to move toward the closest-distance side. If the focusing lens 105 is positioned at the infinity end, the process proceeds to Step 327, where the focusing lens 105 is stopped, and in Step 328 the reset flag is set to "2".

If it is determined in Step 325 that the value of the reset flag is not "1", the value of the reset flag is "2" and it is determined, therefore, that the reset operation of the focusing lens 105 has been completed. In Step 330, the interrupt is disabled to complete the interrupt processing for the reset operation of the counter for position detection as to the focusing lens 105. In Step 331, the process returns to the processing of Steps 301 to 317.

By performing the above-described operation, the speed measurement of the zooming lens 102 is completed and the zooming lens 102 is returned to the same position as when the power source was turned on. Simultaneously, the interrupt is enabled in Step 306, and the operation of resetting the value of the position detection counter for the focusing lens 105 is performed. When the resetting of the position detection counter is completed, the focusing lens 105 is returned to its effective operating range in the remaining time so as to execute an AF operation. Accordingly, although each of the lenses is moved to a great extent until ordinary operating conditions are established after the power source has been turned on, no focal length changes and photography is immediately started with an in-focus state maintained.

As is apparent from the foregoing description, since a plurality of driven elements within the lens system are made to concurrently move before photography is started, the control information required to be obtained before the photography can be found by a rapid measurement. In addition, the driven elements can be located at positions corresponding to a subject at the start of the photography by switching the state of control of the driven elements from movement control to photographic control within the time remaining after the completion of the aforesaid measurement.

In other words, in the lens system arranged to correct the focal plane varying with zooming by moving the focusing lens, it is possible to concurrently in parallel execute the reset operation of the zooming lens for measuring the actual speed of the zooming lens and finding the accurate follow-up speed of the focusing lens and the reset operation of the focusing lens for accurately determining a locus traced by the focusing lens and obtaining control information for causing the focusing lens to move in highly accurate follow-up relation to the zooming lens. Accordingly, initialization of the system can be effected with accuracy in a short time. In addition, as a result of the reduction in the time period of the initialization, the setting of the system which corresponds to the state of photography after the initialization can be performed efficiently in a short time.

What is claimed is:

1. An optical system controlling apparatus comprising:
   (A) a plurality of actuators for varying an optical state;
   (B) a plurality of driving means for driving said plurality of actuators, respectively;
   (C) a plurality of detecting means for detecting the respective states of drive of said plurality of actuators; and
   (D) controlling means for driving each of said driving means on the basis of detection information provided by said detecting means on the basis of a first algorithm and controlling each of said actuators during a steady state, said controlling means being capable of performing initialization of said respective actuators by concurrent processing wherein processing of one of said actuators is effected during the course of processing of another of said actuators on the basis of a second algorithm different from said first algorithm during an initial state before said steady state is established.

2. An optical system controlling apparatus according to claim 1, wherein said optical system controlling apparatus is a camera and said controlling means is arranged to obtain information regarding drive control over each of said actuators for the purpose of photography in accordance with said initialization before said photography is started.

3. An optical system controlling apparatus according to claim 1 or 2, where said controlling means is capable of switching the settings of said respective actuators to steady-state settings during said initialization.

4. An optical system controlling apparatus according to claim 1, wherein said actuators include a zooming lens and a focusing lens.

5. A lens controlling apparatus comprising:
   (A) a plurality of lenses each having a driving part;
   (B) first controlling means for controlling each of said lenses in accordance with a predetermined characteristic; and
   (C) second controlling means capable of effecting initialization of each of said lenses by concurrent processing wherein processing of one of said lenses is effected during the course of processing of another of said lenses.

6. A lens controlling apparatus according to claim 5, wherein said plurality of lenses include a zooming lens and a focusing lens.

7. A lens controlling apparatus according to claim 6, wherein said first controlling means controls said focusing lens on the basis of the position of a focal plane which varies with a movement of said zooming lens.

8. A lens controlling apparatus according to claim 7, wherein said second controlling means determines a driving speed of said focusing lens with respect to a normal driving speed of said zooming lens and effects the initialization by measuring an actual driving speed of said zooming lens, correcting control information on said focusing lens on the basis of an error between said actual driving speed and said normal driving speed and resetting the position of said focusing lens correspondingly with the corrected control information.

9. A lens controlling apparatus according to claim 8, wherein, in the initialization of said zooming lens said second controlling means measures said actual driving speed of said zooming lens and effects speed correction.

10. A lens controlling apparatus according to claim 8, wherein, in the initialization of said focusing lens, said second controlling means causes said focusing lens to move to a predetermined reset position and sets a predetermined value in a position detection counter for said focusing lens.

11. A lens controlling apparatus according to claim 7, wherein said lens controlling apparatus is an inner focus type lens system.

12. A lens controlling apparatus comprising:
   (A) a focusing lens;
   (B) a zooming lens;
   (C) first controlling means for controlling said focusing lens in relation to a movement of said zooming lens on the basis of a predetermined characteristic;
   (D) focus controlling means for controlling said focusing lens on the basis of the state of focus; and
   (E) second controlling means capable of effecting by processing both initialization processing for driving said first controlling means and processing of said focus controlling means, said second controlling means performing said processing of said focus controlling means during said initialization processing.

13. A lens controlling apparatus according to claim 12, wherein said first controlling means corrects the movement of a focal plane caused by a movement of said zooming lens by controlling said focusing lens.

14. A lens controlling apparatus according to claim 13, wherein said second controlling means effects said initialization by measuring a driving speed of said zooming lens, detecting a difference between said measured driving speed and a normal speed, correcting a driving speed of said focusing lens on the basis of a value obtained by detecting the difference and resetting a means for detecting a position of said focusing lens.

15. A lens controlling apparatus according to claim 12, wherein said second controlling means performs processing for a plurality of lenses by utilizing an interrupt during the initialization by said first controlling means.

16. A lens controlling apparatus according to claim 12, wherein said second controlling means performs a focus detecting operation during initialization by said first controlling means and permits said focusing lens to be controlled on the basis of focus detection information while said zooming lens is returning to its initial position.

17. A lens controlling apparatus according to claim 12, wherein said second controlling means performs said initialization when a power source is turned on.

18. A lens controlling apparatus comprising:
   (A) a focusing lens;
   (B) a zooming lens;
   (C) first controlling means for controlling said focusing lens in relation to a movement of said zooming lens on the basis of a predetermined characteristic; and
   (D) second controlling means for concurrently effecting processing of reset operations of said respective zooming and focusing lenses wherein detecting a state of drive of said zooming lens during processing of the reset operation of said zooming lens is employed to correct a drive characteristic of said focusing lens in said processing of the reset operation of said focusing lens.

19. A lens controlling apparatus according to claim 18, wherein said first controlling means corrects a variation in a focal plane which results from a movement of said zooming lens.

20. A lens controlling apparatus according to claim 19, wherein said second controlling means measures a driving speed of said zooming lens to correct a driving speed of said focusing lens which moves in follow-up relation to said zooming lens and to reset the position of said focusing lens.

21. A lens controlling apparatus according to claim 20, wherein said second controlling means operates when a power source is turned on.

22. A lens controlling apparatus according to claim 18, wherein said second controlling means effects processing of the reset operation of said focusing lens by utilizing an interrupt during processing of the reset operation of said zooming lens.

23. A video camera comprising:
(A) a focusing lens;
(B) a zooming lens;
(C) first controlling means for controlling said focusing lens in relation to a movement of said zooming lens on the basis of a predetermined characteristic;
(D) focus controlling means for controlling said focusing lens on the basis of the state of focus of a subject; and
(E) second controlling means capable of effecting first processing for detecting a state of drive of said zooming lens and correcting control information of said first controlling means and resetting the position of said focusing lens and second processing performed by said focus controlling means, said second controlling means concurrently performing said first and second processing.

24. A video camera according to claim 23, wherein said video camera is of an inner focus type.

25. A video camera according to claim 23, wherein said second controlling means operates when a power source is turned on.

26. A video camera according to claim 23, wherein said second controlling means measures a driving speed of said zooming lens to correct a driving speed of said focusing lens which moves in follow-up relation to said zooming lens and to reset the position of said focusing lens.

27. A video camera according to claim 23, wherein said second controlling means effects an initialization of said focusing lens by utilizing an interrupt during an initialization of said zooming lens.

28. A camera apparatus, comprising:
(A) a plurality of optical members for varying an optical state, one of said optical members being a focus adjusting member;
(B) focus control means for driving said focus adjusting member to adjust a focus state;
(C) initializing means for performing initialization processing of said plurality of optical members; and
(D) control means for effecting operation of said focus control means during an operation of the initialization processing by said initializing means.

29. An apparatus according to claim 28, wherein said plurality of optical members includes a zooming member.

30. An apparatus according to claim 29, wherein said initializing means is arranged to measure a driving speed of said zooming member to correct a speed of said focus adjusting member and to drive said focus adjusting member to a predetermined initialization position.

31. An apparatus according to claim 30, wherein said control means is arranged to effect an initializing operation of said focus adjusting member by interruption during said initializing means effecting an initializing operation of said zooming member.

32. An apparatus according to claim 28, wherein said control means is arranged to effect the initializing operation of said focus adjusting member during said initializing means effecting the initializing operation of said zooming member and to operate the focus control means after said initializing operation has terminated said initializing operation, thereby effecting an autofocus operation.

33. An apparatus according to claim 30, wherein said initializing means starts the operation of the initialization processing depending on the power being ON.

34. A camera system, comprising:
(A) a zooming lens;
(B) a focusing lens; and
(C) resetting means for driving the zooming lens and the focusing lens to predetermined initial positions depending on the power being ON in order to reset the zooming lens and the focusing lens, said resetting means being arranged to effect a resetting operation of said focusing lens by interrupting processing during a resetting operation of said zooming lens.

35. A camera system according to claim 34, further comprising:
control means arranged to drive said focusing lens to start a focus adjusting operation where the resetting operation of said focusing lens has been completed before the resetting operation of said zooming lens has been completed.

36. A camera system according to claim 34, wherein said resetting means is arranged to measure a speed of said zooming lens and to drive the focusing lens to its initial position to reset a counter for detecting a position of said focusing lens.

37. A camera system according to claim 36, further comprising:
correcting means for correcting a deviation of a focusing plane which varies according to driving of said zooming lens by driving said focusing lens on the basis of a predetermined characteristic.

38. A camera system according to claim 37, wherein said correcting means is arranged to correct a driving speed of said focusing lens on the basis of a result of measurement of the speed of said zooming lens.

39. A camera system according to claim 36, wherein the initial position of said focusing lens is an infinite end.

* * * * *